(12) United States Patent
Milton

(10) Patent No.: US 10,364,921 B2
(45) Date of Patent: Jul. 30, 2019

(54) WEDGE OF A LEAD-THROUGH SYSTEM

(71) Applicant: Roxtec AB, Karlskrona (SE)

(72) Inventor: Stefan Milton, Ramdala (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 15/571,477

(22) PCT Filed: May 3, 2016

(86) PCT No.: PCT/SE2016/050400
§ 371 (c)(1),
(2) Date: Nov. 2, 2017

(87) PCT Pub. No.: WO2016/178624
PCT Pub. Date: Nov. 10, 2016

(65) Prior Publication Data
US 2018/0128399 A1    May 10, 2018

(30) Foreign Application Priority Data
May 4, 2015  (SE) ..................... 1550565

(51) Int. Cl.
*H02G 15/013*  (2006.01)
*F16L 5/08*   (2006.01)
*H02G 3/22*   (2006.01)
*F16L 5/14*   (2006.01)

(52) U.S. Cl.
CPC ............. *F16L 5/08* (2013.01); *F16L 5/14* (2013.01); *H02G 3/22* (2013.01)

(58) Field of Classification Search
CPC ......... H02G 15/013; F16L 5/05; F16J 15/022
USPC ............... 174/77 R, 657, 93; 277/606, 630
See application file for complete search history.

(56) References Cited

U.S. PATENT DOCUMENTS 1,491,873 A      4/1924   McMurtrie
3,282,544 A  *  11/1966   Brattberg ............... F16L 3/227
                                                   248/56
5,628,519 A  *   5/1997   Kakehi ................. B29C 45/2616
                                                   264/328.12

(Continued)

FOREIGN PATENT DOCUMENTS

CN       1160438 A      9/1997
CN      203240158 U    10/2013

(Continued)

OTHER PUBLICATIONS

International Search Report and Written Opinion for PCT/SE2016/050400 dated Jun. 28, 2016.

(Continued)

*Primary Examiner* — Chau N Nguyen
(74) *Attorney, Agent, or Firm* — Merchant & Gould P.C.

(57) ABSTRACT

The present invention concerns a compression wedge of a lead-through system. The compression wedge comprises a number of wedge elements (1, 2, 3, 4). At least one of the wedge elements (1, 2, 3, 4) has a core (9, 10, 11, 12) of a harder material than an outer part surrounding the core (9, 10, 11, 12). The part surrounding the core (9, 10, 11, 12) is made of an elastic material. The wedge is moved between a non-compression state and a compression state by means of one single screw (6) co-operating with a socket (7).

9 Claims, 3 Drawing Sheets

(56) References Cited

U.S. PATENT DOCUMENTS

| | | | | |
|---|---|---|---|---|
| 5,938,152 A | * | 8/1999 | Kreutz | F16L 5/08 |
| | | | | 174/656 |
| 7,762,559 B2 | * | 7/2010 | Suzuki | F16J 15/104 |
| | | | | 277/627 |
| 8,096,562 B2 | * | 1/2012 | Johansson | F16L 5/08 |
| | | | | 174/40 CC |

FOREIGN PATENT DOCUMENTS

| | | |
|---|---|---|
| DE | 19602760 A1 | 7/1997 |
| EP | 1484541 A1 | 12/2004 |
| WO | WO 96/11353 A1 | 4/1996 |
| WO | WO 2006/115064 A1 | 11/2006 |
| WO | WO 2008/010755 A1 | 1/2008 |
| WO | WO 2010/147534 A1 | 12/2010 |

OTHER PUBLICATIONS

Office Action and Search Report for CN 201680026042.X dated Dec. 19, 2018.

* cited by examiner

WEDGE OF A LEAD-THROUGH SYSTEM

This application is a National Stage Application of PCT/SE2016/050400, filed 3 May 2016, which claims benefit of Swedish Patent Application No. 1550565-4, filed 4 May 2015, which applications are incorporated herein by reference. To the extent appropriate, a claim of priority is made to each of the above disclosed applications.

TECHNICAL FIELD

The present invention concerns a wedge for a lead-through system.

PRIOR ART

The present invention is mainly intended for a lead-through system comprising a frame, a number of modules, stay plates and a wedge. The modules, stay plates and the wedge are placed inside the frame. The modules are made of a compressible material and each module is to receive a cable, pipe or wire. The function of the stay plates is to hinder the modules from going out of the frame in use. The wedge is a compression means which are to compress the modules in order for them to seal inwardly against the pipe, cable or wire and outwardly against other modules, stay plates and/or the frame, depending on the placement inside the frame.

Lead-through systems of this kind are used in many different environments, such as for cabinets, technical shelters, junction boxes and machines and also decks and bulkheads of ships. They are used in different industrial environments, such as automotive, telecom, power generation and distribution as well as marine and offshore. They may have to seal against fluid, gas, fire, rodents, termites, dust, moisture etc.

In one wedge according to prior art (WO 96/11353) the wedge is moved between a non-compression state and a compression state by means of two screws, whereby each screw has threads with opposite pitches. The screws are connected to two wedge elements, which are moved towards each other if the screws are turned in a first direction and away from each other if the screws are turned in an opposite direction. The threads of the screws are in mesh with threads of the wedge elements, whereby the threads of one of the wedge elements are in mesh with threads of a first pitch of the screws and the threads of the other wedge element are in mesh with threads of an opposite pitch of the screws. Two further wedge elements are placed on sloping surfaces on opposite sides of the two first wedge elements, whereby the two further wedge elements will be moved towards and away from each other depending on the movement of the two first wedge elements. When the two further wedge elements are moved away from each other the thickness of the wedge increases, giving a compression force when placed inside the frame.

The wedge elements of the prior art are made completely of an elastic, compressible rubber material. The rubber material is used to seal against the frame and adjacent stay plate. To place the wedge in a compression state the screws have to be turned both to move the wedge elements and also to compress the rubber material of the wedge elements. The two screws of the wedge are normally turned alternately in order for the wedge elements not to be skewed. In the prior art wedge the two screws have to be turned a relatively long way to give the desired compression force. The screws have to be given relatively many turns due to the two screws and the elasticity of the rubber material of the wedge. This is often felt as cumbersome to a fitter and may result in a non-complete compression, especially if the fitter is pressed for time.

SUMMARY

In view of the above, one object of the present invention is to facilitate placing the wedge in a compression state.

According to one aspect of the present invention a wedge is provided, which wedge comprises a number of wedge elements. The wedge forms a part of a lead-through system for cables, pipes or wires. The lead-through system further comprises a frame and one or more modules, wherein the wedge and the one or more modules are placed inside the frame. The modules are to receive the cables, pipes or wires and the thickness of the wedge is adjustable to compress the modules inside the frame. At least one of the wedge elements has a core of a harder material than an outer part surrounding the core. In one embodiment each wedge element has a core of a hard material.

According to another aspect of the invention, the thickness of the wedge is adjustable by means of an arrangement comprising one single screw co-operating with a socket.

By having wedge elements with a hard core and an adjustment means comprising only one screw co-operating with a socket, the number of mutual turns of the co-operating screw and socket is reduced compared to prior art wedges, normally having wedge elements completely of a rubber material and two screws.

Further objects and advantages of the present invention will be obvious to a person skilled in the art when reading the detailed description below of at present preferred embodiments.

BRIEF DESCRIPTION OF THE DRAWINGS

The present invention will be described further below by way of example and with reference to the enclosed drawings. In the drawings.

DETAILED DESCRIPTION OF EMBODIMENTS

Figure 1:
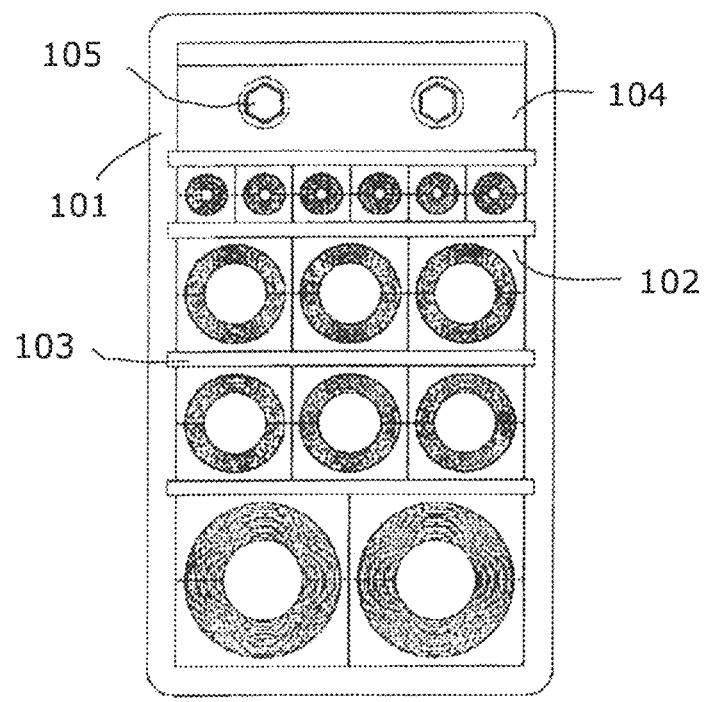
FIG. 1 is a front view of a lead-through system of prior art.

The wedge of the present invention is intended for use in a lead-through system as exemplified in FIG. 1. The exact form of the different parts of the lead-through system may vary. In the shown embodiment a frame 101 receives a number of modules 102. The frame 101 is to be placed in a transition, such as a wall, roof or floor, and each module 102 is to receive a cable, wire or pipe. To assist in holding the modules 102 in place inside the frame 101 a number of stay plates 103 are arranged between each row of modules 102 inside the frame 101. The stay plates 103 are arranged moveable in longitudinal direction inside the frame 101, i.e. up and down as shown in FIG. 1. A wedge 104 according to prior art is placed at one inner end of the frame 101, with a stay plate 103 between the wedge 104 and the adjacent row of modules. The prior art wedge 104 is a compression unit and by means of two screws 105 the wedge 104 can be expanded inside the frame 101. The expansion of the wedge 104 will act on the modules 102 inside the frame 101, whereby the modules 102 will be pressed against each other, against the stay plates 103, against the inner sides of the frame 101 and/or against any cable etc. received inside a module 102, depending on the placement of respective module 102.

The wedge of the present invention comprises a first wedge element 1, a second wedge element 2, a third wedge element 3 and a fourth wedge element 4. The wedge further comprises a handle 5, a screw 6, a socket 7 and a nut 8.

The first wedge element 1 has a core 9 of a harder material than the surrounding material. In the same way the second wedge element 2 has a core 10 of harder material, the third wedge element 3 has a core 11 of harder material and the fourth wedge element 4 has a core 12 of harder material. The outer parts of the wedge elements 1, 2, 3, 4 are made of the same material and the core 9, 10, 11, 12 of each wedge element 1, 2, 3, 4 is made of the same material. The outer part of each wedge element 1, 2, 3, 4 is made of an elastic, compressible rubber material and the core 9, 10, 11, 12 of each wedge element 1, 2, 3, 4 is made of a composite material. The core 9, 10, 11, 12 of respective wedge element 1, 2, 3, 4 is made to be strong enough to withstand the expected forces without being compressed.

In some embodiments not all of the wedge elements have a hard core. In one embodiment only the first and second wedge elements have a hard core, while the third and fourth wedge elements are entirely made of a rubber material. In a further embodiment only the third and fourth wedge elements have a hard core, while the first and second wedge elements are entirely made of a rubber material.

The first and second wedge elements 1, 2 are arranged in line with each other and moveable towards and away from each other. The third and fourth wedge elements 3, 4 are placed above each other and moveable towards and away from each other. The third and fourth wedge elements 3, 4 are placed between the first and second wedge elements 1, 2. The first wedge element 1 abuts the third wedge element 3 and the fourth wedge element 4 along sloped surfaces. The second wedge element 2 abuts the third wedge element 3 and the fourth wedge element 4 along sloped surfaces. The wedge elements 1, 2, 3, 4 and their co-operating sloped surfaces are arranged in such a way that when the first wedge element 1 and the second wedge element 2 are moved toward each other the third wedge element 3 and the fourth wedge element 4 are moved away from each other. Correspondingly, when the first wedge element 1 and the second wedge element 2 are moved away from each other the third wedge element 3 and the fourth wedge element 4 are allowed to move toward each other. The first wedge element 1 and the second wedge element 2 each have a through opening. Said through openings are placed in line with each other in the assembled wedge. The through opening of the first wedge element 1 has a larger diameter at a part facing away from the second wedge element 2 than at a part facing the second wedge element 2. Thereby, a stop edge 13 is formed inside the through opening of the first wedge element 1. The purpose of said stop edge 13 will be explained below.

The screw 6 of the wedge is placed in the through openings of the first wedge element 1 and the second wedge element 2, respectively. The end of the screw 6 placed inside the second wedge element 2 has a first thread 14. The opposite end of the screw 6, i.e. the end placed at the first wedge element 1, has also a second thread 15, which second thread 15 stops before an outer end 16 of the screw 6. The outer diameter of the second thread 15 placed at the first wedge element 1 is larger then the outer diameter of the outer end 16 and the rest of the screw 6. Stop edges 17, 18 are thereby formed at the junctions between the second thread 15 and the outer end 16 and between the second thread 15 and the rest of the screw 6, respectively. The function of said stop edges 17, 18 will be explained below.

The socket 7 of the wedge has a tubular part 19 and forms a nut 20 at one end opposite the tubular part 19. A flange 21 is formed between the tubular part 19 and the nut 20, which flange 21 projects outwardly around the circumference of the tubular part 19 and is perpendicular to the tubular part 19. The socket 7 is made in one piece. A groove 22 is arranged on the outside of the tubular part 19, which groove 22 goes all around the circumference of the tubular part 19. The groove 22 is placed at a short distance from the flange 21 of the socket 7. The socket 7 has a through opening 23. The diameter of the through opening 23 is larger inside the tubular part 19 than inside the flange 21 and the nut 20. A stop edge 24 is thereby formed inside the through opening 23 of the socket 7. The through opening 23 has an inner thread in the area of the tubular part 19. The purpose of the threaded through opening 23, the stop edge 24, the flange 21 and the groove 22 of the socket 7 will be explained below.

The nut 8 has a tubular part 25 at one end, having an outer thread. A polygonal part 26 follows the tubular part 25 and then comes an outer end 27. The outer end 27 is circular and chamfers towards the free end. Inside the tubular part 25 and the polygonal part 26 an inner opening 28 is arranged going from the free end of the tubular part 25 up to the outer end 27. There is no opening in the outer end 27. The inner opening 28 has an inner thread. The nut 8 is made in one piece. The purpose of the threads and the polygonal part 26 will be explained below.

Figure 2:
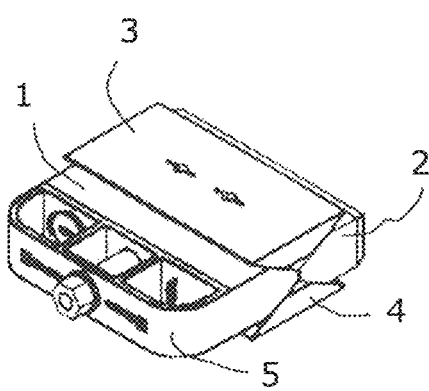
FIG. 2 is a perspective view of a wedge of the present invention, which could be used in a system according to FIG. 1.
Figure 3:
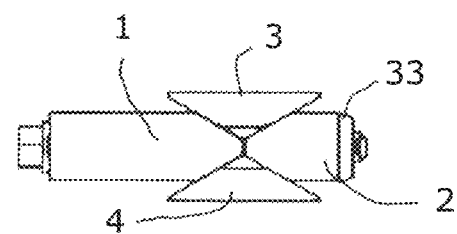
FIG. 3 is a side view of the wedge of FIG. 2.
Figure 4:
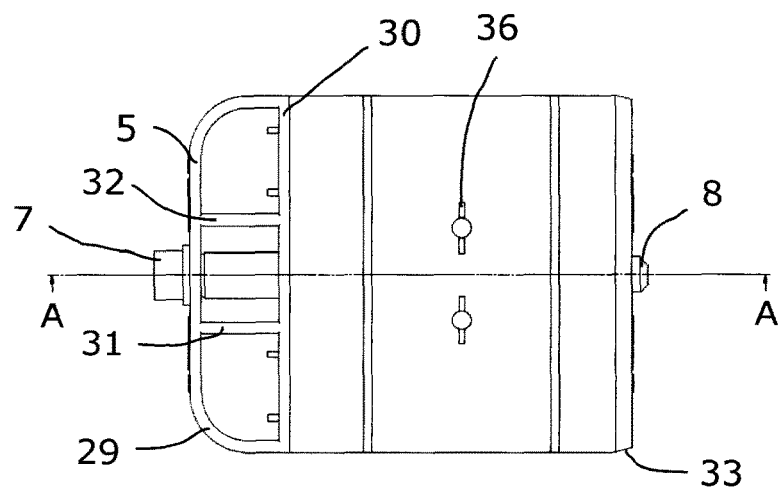
FIG. 4 is a plan view of the wedge of FIGS. 2 and 3.

The handle 5 is integrated with the core 9 of the first wedge element 1. The handle 5 comprises an arc 29, an attachment plate 30 and two struts 31, 32, extending between the arc 29 and the attachment plate 30. The attachment plate 30 abuts the outer softer material of the first wedge element 1 and extends over the total width of the wedge. The arc 29 is placed at opposite ends of the attachment plate 30 and goes via two bent parts over into a straight part. The straight part of the arc 29 is placed at a distance from the attachment plate 30 and is parallel with the attachment plate 30. The straight part of the arc 29 has a through opening placed in the centre of said straight part. Also the attachment plate 30 has a through opening placed in line with the through opening of the arc 29. The struts 31, 32 are placed at a distance from each other, which distance should be at least big enough to give room for the socket 7. As shown in FIGS. 2 and 3 the wedge can have a chamfer 33 at the outer end of the second wedge element 2, in order to facilitate insertion of the wedge into a frame. Normally all of the handle 5 and the hard core 9 of the first wedge element 1 are made in one piece.

In other embodiments the wedge has no handle.

The third and fourth wedge elements 3, 4 are connected to each other by two spring arrangements. Each spring arrangement comprises a spring 34, a rod 35 and two pins 36. The spring 34 is placed surrounding the rod 35 in through openings of the third and fourth wedge elements 3, 4, which trough openings are placed in line with each other. In an alternative embodiment of the spring arrangement there is no rod placed inside the spring 34. At the mouth of each through opening on the outside of the third wedge element 3 and the fourth wedge element 4, respectively, there is an elongated groove crossing said mouth. Each end of the spring 34 is hooked around one of the pins 36, which pins 36 then are placed in one groove each. By means of the spring arrangements the third and fourth wedge elements 3, 4 will be urged in a direction towards each other.

In the shown embodiment the nut 8 is fastened inside the second wedge element 2. The second wedge element 2 is in one embodiment injection moulded around the tubular part 25 and the polygonal part 26 of the nut 8. The material of the second wedge element 2 will then go into the outer thread of the tubular part 25 and be placed abutting all of the sides of the polygonal part 26 of the nut 8. The nut 8 will thereby be held firmly inside the second wedge element 2 and be hindered to do any axial or rotational movements. The end opposite the outer end 16 of the screw 6 is inserted into the nut 8. The screw 6 is screwed into the inner opening 28 of the nut, by means of co-operation between the first thread 14 of the screw 6 and the thread of the inner opening 28 of the nut 8. The end of the screw 6 is locked from rotating inside the threaded opening 28 of the nut 8 by means of a thread-locking fluid or threadlocker.

As stated above the screw 6 goes through a through opening of the first wedge element 1. In the assembled condition of the wedge the screw 6 goes between the third wedge element 3 and the fourth wedge element 4, respectively.

The socket 7 is placed going through a central through opening of the arc 29 of the handle 5 and through a central through opening of the attachment plate 30 of the handle 5. The outer end 16 of the screw 6 is received inside the socket 7, whereby the second thread 15 at said outer end 16 of the screw 6 mesh with the thread in the through opening 23 of the socket 7. Thus, by means of the thread of respective part the position of the screw 6 may be varied inside the through opening 23 of the socket 7. The socket 7 is held at the arc 29 of the handle 5 by means of a locking ring 37 being placed in the groove 22 on the outside of the tubular part 19 of the socket 7. The socket 7 is held by the locking ring 37 in a rotatable way. The arc 28 is placed between the flange 21 of the socket 7 and the locking ring 36 placed in the groove 22 of the socket 7. To hold the socket 7 at the handle 5 the distance between the flange 21 and the groove 22 of the socket 7 should about correspond with the thickness of the arc 29 of the handle 5.

In the assembled wedge the screw 6 is held stationary in relation to the second wedge element 2, without any rotation or axial movement, but may move axially in relation to the socket 7, by means of rotation for the socket 7 on the screw 6.

In one embodiment there is no socket. In stead the screw is held rotatable at the handle, and not moveable in an axial direction of the screw. In the same way as for the socket described above the screw is held at the handle, in that the handle is held between a flange of the screw and a lock ring received in a groove of the screw. In this embodiment the screw has a nut-form at the end of the screw placed at the handle, whereby the nut-formed end will be placed outside the handle. In this embodiment the screw is rotated inside the nut placed in the second wedge element, whereby the screw will be moved further into the nut in rotation in one direction and less into the nut in rotation in the opposite direction. As the first and second wedge elements are fixed to the screw and the nut, respectively, the first and second wedge elements will be moved toward each other or away from each other depending on the direction of rotation for the screw.

Figure 5:
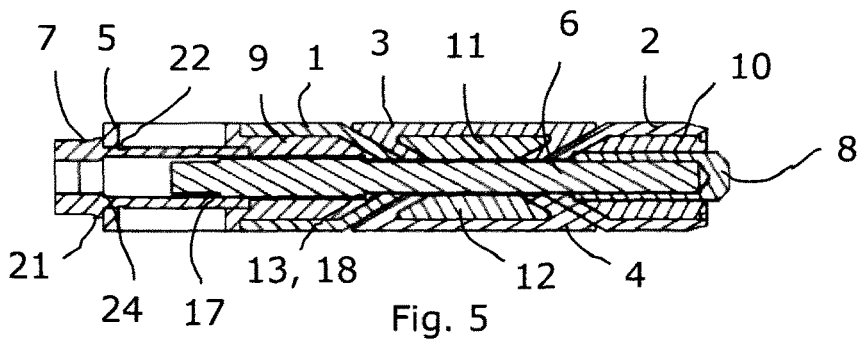
FIG. 5 is a sectional view of the wedge along the line A-A in FIG. 4, with the wedge in a non-compressing state.
Figure 6:
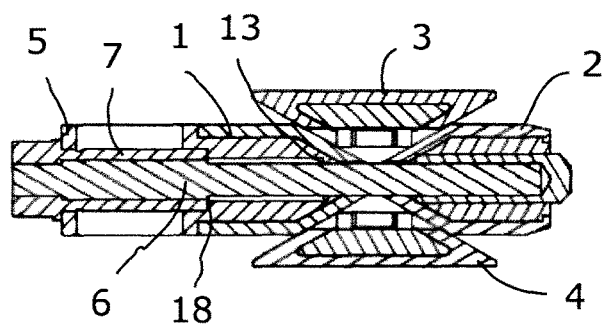
FIG. 6 is a sectional view of the wedge along the line A-A in FIG. 5, with the wedge in a compressing state.
Figure 7:
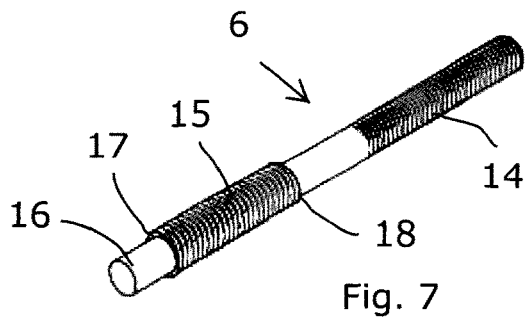
FIG. 7 is a perspective view of a screw forming a part of the wedge of FIGS. 2-6.
Figure 8:
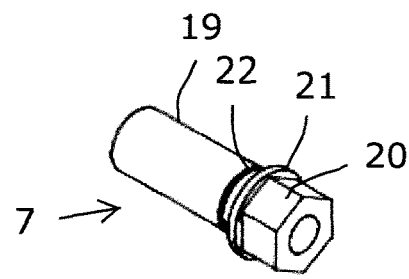
FIG. 8 is a perspective view of a socket forming a part of the wedge of FIGS. 2-6.
Figure 9:
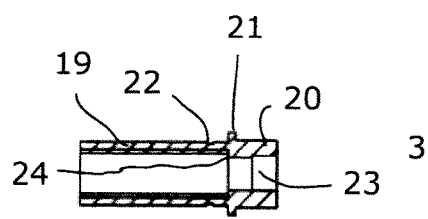
FIG. 9 is a sectional view of the socket of FIG. 8.
Figure 10:
FIG. 10 is a plan view of a locking ring, to be used with the socket of FIGS. 8 and 9.
Figure 11:
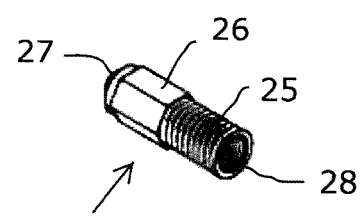
FIG. 11 is a perspective view of a nut forming a part of the wedge of FIGS. 2-6.
Figure 12:
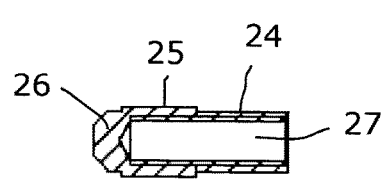
FIG. 12 is a sectional view of the nut of FIG. 11.
Figure 13:
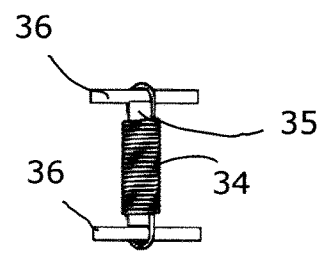
FIG. 13 is a side view of a spring arrangement forming a part of the wedge.

In use the wedge is moveable between two extremes. In a first extreme, as shown in FIG. 5, an upper surface of the third wedge element 3 is about flush with an upper surface of the first wedge element 1 and an upper surface of the second wedge element 2 and a lower surface of the fourth wedge element 4 is about flush with a lower surface of the first wedge element 1 and a lower surface of the second wedge element 2. This first extreme of the wedge could be called a flattened out position, as the wedge is as thin as it gets in that position. In said extreme the third and fourth wedge elements 3, 4 are abutting or are placed close to the screw 6. In a second extreme, as shown in FIG. 6, the first and second wedge elements 1, 2 are moved as close to each other as they can be moved and the third and fourth wedge elements 3, 4 are moved as far apart from each other as they can be moved. In the second extreme the wedge is as thick as it gets. In use the wedge may assume any position between the extremes, and including said extremes.

In the first extreme the stop edge 18 at the inner end of the second thread 15 of the screw 6 will abut the stop edge 13 inside the through opening of the first wedge element 1. These stop edges 13, 18 will give a distinct stop of the movement flattening the wedge out. In the second extreme the stop edge 17 at the outer end of the screw 6 will abut the stop edge 24 in the through opening 23 of the socket 7, giving a distinct stop in said second extreme.

The wedge is normally placed inside the frame with the wedge in the first extreme, i.e. the flattened out condition, whereby no compression force will be exerted on the modules inside the frame. The chamfers 33 at the outer end of the second wedge element 2 facilitate insertion of the wedge into the frame. When the wedge is in the second extreme it will exert maximal compression force on the modules inside the frame. If the wedge is to be removed from the frame the wedge is brought to the first extreme and then the wedge is drawn out by gripping the handle 5.

By rotating the socket 7, e.g. by means of a wrench placed on the nut 20 of the socket 7, in a first direction the wedge will go towards the first extreme and by rotating the socket in the opposite direction the wedge will go towards the second extreme. By rotation of the socket 7 the screw 6 will be moved axially in relation to the socket 7. This relative axial movement between the screw 6 and the socket 7 is given by co-operation between the second thread 15 at the outer end 16 of the screw 6 and the thread of the through opening 23 of the socket 7. By said relative axial movement between the screw 6 and the socket 7 the first and second wedge elements 1 and 2 are given a corresponding relative axial movement, moving the first and second wedge elements 1, 2 towards or away from each other, depending on the rotational direction of the socket 7. When the first and second wedge elements 1, 2 are moved towards each other the third and fourth wedge elements 3, 4 will be forced away from each other, sliding along the sloped surfaces of the first and second wedge elements 1, 2, respectively. When the first and second wedge elements 1, 2 are moved away from each other the third and fourth wedge elements 3, 4 are allowed to move toward each other, sliding along the sloped surfaces of the first and second wedge elements, 1, 2, respectively. The third and fourth wedge elements 3, 4 will be urged towards each other by means of the springs 34 connected to the pins 36 placed in grooves on the outer surfaces of the third and fourth wedge elements 3, 4 and by means of the elastic modules inside the frame.

In addition to the wedge elements 1, 2, 3, 4 being moved relative to each other by the rotation of the socket 7 on the screw 6, said rotation will also influence compression of the outer rubber material of respective wedge element 1, 2, 3, 4. The hard core 9, 10, 11, 12 of respective wedge element 1, 2, 3, 4 will not be compressed. In view of wedges of prior art the movement of the wedge elements 1, 2, 3, 4 due to the elastic material will be relatively short, compared to if the wedge elements are made entirely of an elastic rubber material.

By amending the pitch of the second thread 15 of the screw 6 and the thread of the inner opening 23 of the socket 7, the number of turns of the socket 7 on the screw 6 between the extremes of the wedge may be varied.

The number of turns for the socket 7 on the screw 6 also depends on the hardness and thickness of the rubber material. By amending the rubber material and/or its thickness the required number of turns may be adjusted. The core of the wedge elements has a Rockwell M hardness of preferably 94-103. The outer elastic, compressible rubber material of the wedge elements has a Shore A hardness of preferably 75±5. The outer rubber material of the wedge elements has a general thickness of about 3 mm. However, at the sides of the wedge elements to abut opposite sides of the frame after insertion of the wedge into the frame, the outer rubber material has a thickness of about 10 mm.

The invention claimed is:

1. A wedge of a lead-through system for cables, pipes, or wires, said lead-through system further comprises a frame and one or more modules, wherein the wedge and the one or more modules are placed inside the frame, wherein the modules are to receive the cables, pipes or wires, wherein the thickness of the wedge is adjustable to compress the modules inside the frame, wherein the wedge comprises a first wedge element and a second wedge element placed in line with each other and arranged movable towards and away from each other, wherein the wedge further comprises a third wedge element and a fourth wedge element, and wherein the third wedge element and the fourth wedge element are placed on opposite sides of the first wedge element and the second wedge element and abutting the first wedge element and second the wedge element along sloping surfaces, wherein each of the first wedge element, the second wedge element, the third wedge element, and the fourth wedge element comprises a core and an outer part surrounding the core, wherein the outer part comprises an elastic material and the core comprises a harder material than the elastic material, and wherein the elastic material of each of the first wedge element, the second wedge element, the third wedge element, and the fourth wedge element abuts the elastic material of two of the other of the first wedge element, the second wedge element, the third wedge element, and the fourth wedge element, and further comprising one single screw co-operating with one socket is used to move the first and second wedge elements towards and away from each other, wherein the socket is fixed in a rotatable way in relation to the first wedge element and the screw is fixed in a non-rotatable way in relation to the second wedge element, wherein an outer end of the screw is received in a through opening of the socket, whereby an inner thread of the through opening of the socket is in mesh with a second thread at the outer end of the screw, and wherein the first wedge element and the second wedge element are moveable toward and away from each other by rotation of the socket on the screw.

2. The wedge of claim 1, wherein the outer part of each wedge element is made of an elastic material.

3. The wedge of claim 2, wherein the outer part of each wedge element is made of a rubber material.

4. The wedge of claim 3, wherein the rubber material of the outer part of each wedge element has a Shore A hardness of 75±5.

5. The wedge of claim 3, wherein the rubber material of the outer part of each wedge element has a thickness of about 3 mm except at sides that abut opposite sides of the frame after insertion of the wedge into the frame, which sides have a thickness of about 10 mm.

6. The wedge of claim 1, wherein the core of each wedge element is made of a composite material hard enough to withstand the expected pressure exerted by the wedge without any deformation.

7. The wedge of claim 1, wherein each of the wedge elements has the sloping surfaces arranged so that the third and fourth wedge elements move away from each other when the first and second wedge elements move toward each other, and the third and fourth wedge elements are free to move toward each other when the first and the second wedge elements move away from each other.

8. The wedge of claim 1, wherein the core of each wedge element has a Rockwell M hardness of 94-103.

9. The wedge of claim 1, wherein the socket has a tubular part, a nut at one end of the tubular part, and a flange provided between the tubular part and the nut.

* * * * *